US008115628B2

(12) United States Patent
Stevens et al.

(10) Patent No.: US 8,115,628 B2
(45) Date of Patent: Feb. 14, 2012

(54) DOT-TAG VISIBILITY NETWORK ARCHITECTURE

(75) Inventors: John K. Stevens, Stratham, NH (US); David Cramer, Orangeville, CA (US); Tom Packert, Miami, FL (US)

(73) Assignee: Visible Assets, Inc., Mississauga, Ontario (CA)

( * ) Notice: Subject to any disclaimer, the term of this patent is extended or adjusted under 35 U.S.C. 154(b) by 0 days.

(21) Appl. No.: 12/705,115

(22) Filed: Feb. 12, 2010

(65) Prior Publication Data

US 2010/0322168 A1 Dec. 23, 2010

Related U.S. Application Data

(63) Continuation of application No. 11/764,360, filed on Jun. 18, 2007, now abandoned.

(60) Provisional application No. 60/805,020, filed on Jun. 16, 2006.

(51) Int. Cl.
*G08B 13/14* (2006.01)
*G06Q 10/00* (2006.01)
*G06F 7/00* (2006.01)

(52) U.S. Cl. ........ 340/568.1; 705/28; 700/215; 700/225

(58) Field of Classification Search ................ 340/5.92, 340/825.49, 572.1–572.9; 235/385; 705/22, 705/28; 700/215, 225, 226
See application file for complete search history.

(56) References Cited

U.S. PATENT DOCUMENTS

| | | | | |
|---|---|---|---|---|
| 6,681,198 | B2 * | 1/2004 | Buote et al. | 702/185 |
| 6,901,304 | B2 * | 5/2005 | Swan et al. | 700/115 |
| 7,414,571 | B2 * | 8/2008 | Schantz et al. | 342/125 |
| 2003/0155415 | A1 * | 8/2003 | Markham et al. | 235/376 |
| 2004/0064382 | A1 * | 4/2004 | Negron | 705/28 |
| 2004/0199543 | A1 * | 10/2004 | Braud et al. | 707/104.1 |
| 2004/0222889 | A1 * | 11/2004 | Hoshina et al. | 340/572.8 |
| 2005/0199716 | A1 * | 9/2005 | Shafer et al. | 235/385 |
| 2006/0020499 | A1 * | 1/2006 | Aitipamula et al. | 705/7 |
| 2006/0047787 | A1 * | 3/2006 | Agarwal et al. | 709/220 |

* cited by examiner

*Primary Examiner* — Jennifer Mehmood
(74) *Attorney, Agent, or Firm* — Larson & Anderson, LLC

(57) ABSTRACT

The system employs full transceivers, each having peer-to-peer, client/server, and IP networking capabilities, and covering open-area ranges of up to 100 feet. The system uses Low Frequency for data communications so it can achieve both low cost (less costly than many RF-ID tags) and long battery life (10-15 years). Additionally, since these tags have batteries, static RAM maybe be added at very low cost, as well as sensors, LED's displays etc. The system also employs a sidewinder that communicates to said tag regularly, said sidewinder keeps the IP address of said tag. The system also employs an embedded VPN. The VPN includes a suite of diagnostic tools that run on a laptop. The system also includes a visibility data server that communicates to the sidewinder by the VPN. The data server includes a virtual tag data base, said virtual tag data base updated by the sidewinder.

19 Claims, 13 Drawing Sheets

Example Visibility Net

1000

Smart RuBee Shelf

1001

1002

1003

DOT-TAG VISIBILITY NETWORK ARCHITECTURE

This application claims is a continuation of U.S. patent application Ser. No. 11/764,360, filed Jun. 18, 2007, now abandoned, which claims priority from U.S. application No. 60/805,020 filed Jun. 16, 2006, which application is incorporated herein by reference for all purposes.

BACKGROUND

Prior-art systems use RF tags that can be subjected to any Electromagnetic Interference (EMI) risk to hearing aid wearers, pacemakers, or IDC patients and had problems with Electromagnetic Compatibility worldwide.

Prior-art systems always had bandwidth as an issue. Prior-art systems also had high cost, low client count, short battery life and can only function in mild environment (away from steel and water). Many cost-sensitive, power "limited" applications exist (e.g., most industrial visibility networks) that may not require bandwidth, yet do require real-time, peer-to-peer networking with extended battery life.

The purpose for the below-described preferred embodiment to address above-listed problems within a long-wavelength network.

SUMMARY

The Visibility Network is designed to provide real-time web enabled asset visibility. The RuBee IV protocol was designed to work reliably in a local visibility network and provide real-time visibility for assets, people, and livestock, pedigree and provide chain of possession events.

RuBee works over a controlled-range, wide area (1'×1' to 100'×100') in harsh environments (that is, near metals, liquids and through earth), with an extended battery life (10-15 years), and a high safety standard. The network's design goal was to create a low cost two-way radio tag that is safe for use in hospital patient-based settings, hospital operating rooms, airports and other public facilities. RuBee could not accept any Electromagnetic Interference (EMI) risk to hearing aid wearers, pacemaker, or IDC patients and has no known or Electromagnetic Compatibility (EMC) issues worldwide. Yet, RuBee provides range and the reliability needed to produce a real-time visibility network. Every radio tag attached to an asset appears to be a mini-web asset server within the Visibility Network. The Long Wavelength ID (LWID) tag has an antenna operable at a low radio frequency not exceeding 1 megahertz The tag also has a radiating transceiver operatively connected to said antenna, the transceiver operates to transmit and receive data at low radio frequency. The tag also has a programmed data processor to process data received from the transceiver. The data processor usually is a low cost 4-bit processor capable of encrypting and decrypting and complex functions associated with managing IP addresses. The tag associated with a first IP address. The tag has a volatile memory that stores said IP address. The transceiver emits an identification signal based upon said IP address stored in the volatile memory. The tag also has an energy source used for activating the transceiver and the data processor. Any RuBee IV tag if enabled properly may be searched and discovered on Google or the VAI "Dot-Tag" network.

The local network of tags talks to a RuBee Router (Sidewinder). The Sidewinder manages the local tag net in real time in much the same way any WiFi router manages a TCP/IP network. The Sidewinder communicates by a VPN to a data server which manages a PostgresSQL database of virtual tags (the Dot-Tag Visibility Data Server).

Long wavelength, produces little, if any energy dissipated in the form of an electrical field (E). Long wavelength transmissions radiate energy (99.99%) in the form of a magnetic field (H). The RuBee radio tags are inductive tags and typically need a minimum signal of 0.1 milligauss to a maximum of about 300 milligauss for reliable communication. The strongest field near or on top of a base station antenna can be about 1200 milligauss, however most standard antennas are in the 100-300 milligauss range. To help provide some context for these values, the earth's magnetic field is 300-600 milligauss.

The systems are installed in several major retailers as in-store inventory visible systems, in hospitals to provide medical device visibility, other healthcare applications providing real time inventory visibility on high valued products throughout distribution, in agricultural applications providing visibility and age verification for cattle, and in other industries providing identity systems and visibility systems for patients, physicians, policemen, firemen, correctional officers and corporate employees.

The advantage of this system low cost to clients, low cost base stations and routers, long battery life tags, high client/tag counts within a single network, and work in harsh environments (near steel and water).

DETAILED DESCRIPTION

Figure 1:
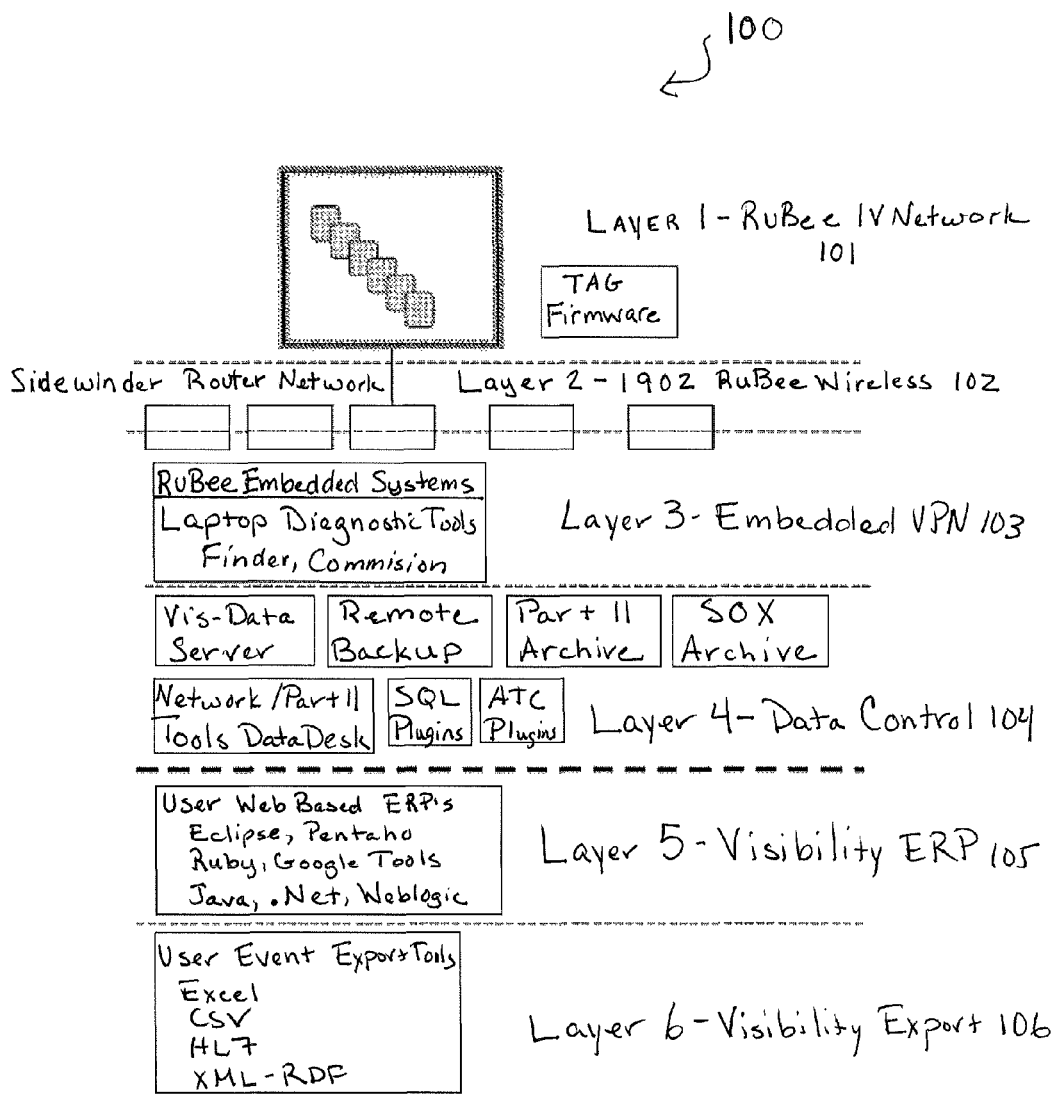
FIG. 1 shows a block diagram of a Visibility Network.

FIG. 1 shows one exemplary Visibility Network 100 in accordance with one embodiment. The Visibility Network 100 includes six layers. The first layer 101 is a RuBee IV Network Layer. The second layer 102 is a RuBee wireless network connection. The third layer 103 is an embedded VPN connection between the second layer 104 and a forth layer 104. The forth layer 104 is a data plus control that creates and preserves a data in a virtual tag data base. The fifth layer 105 is a visibility ERP and the sixth layer 106 is a Visibility Export layer.

Figure 2:
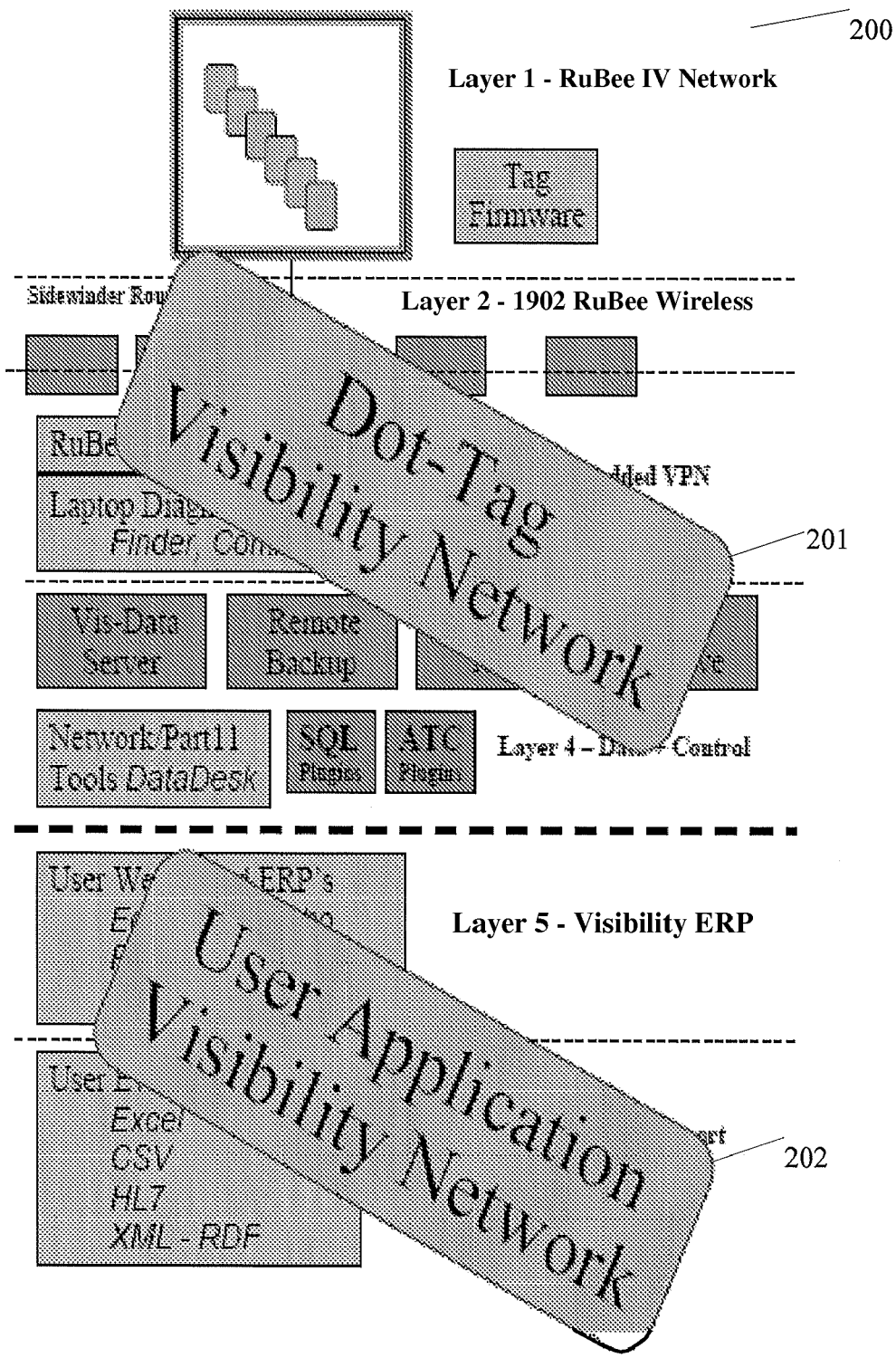
FIG. 2 shows a block diagram of a Dot-Tag Visibility Network and a User Application Visibility Network.

FIG. 2 shows a block diagram 200 of the Visibility Network 100 that includes a Dot-Tag Visibility Network 201 and a User Visibility Network 202.

Figure 3:
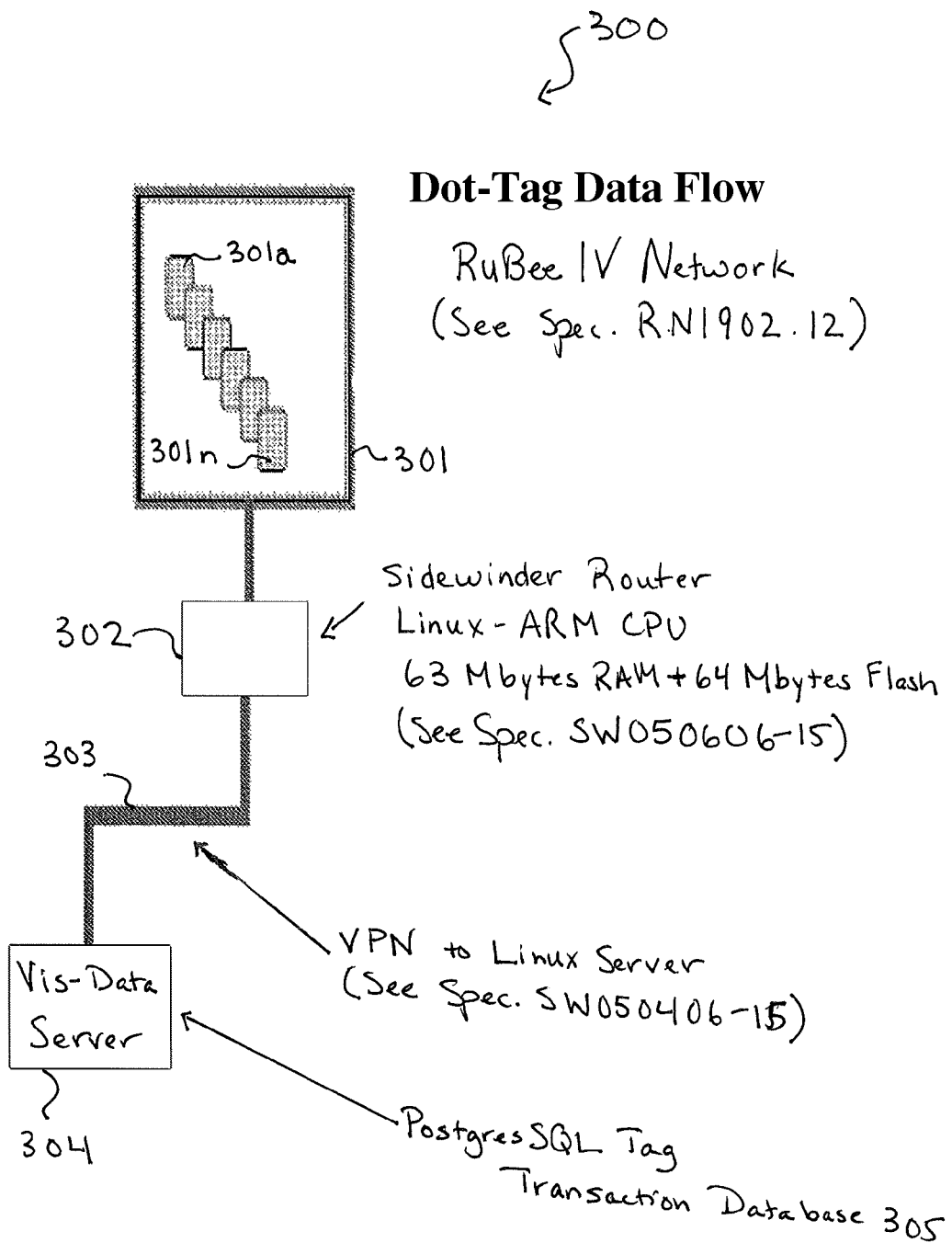
FIG. 3 shows a block diagram for the Dot-Tag Visibility Network.

FIG. 3 is a block diagram 300 that shows The Dot-Tag Visibility Network 201. The Dot-tag Visibility Network 201 starts with many local RuBee Networks'301. In a RuBee Network 301 each sidewinder 302 communicates to the RuBee Tags 301a through 301n contained within its local net regularly. This time set by the user (each 10 minutes typical).

The sidewinder 302 keeps a table of IP addresses and subnet addresses of all active and legible tags plus all tag data within its RuBee network 301. If a tag 301a has problems or is missing or has a bad CRC check it gets flagged in a trouble table. If any new tag appears within a Network it is placed in the new tag table. Each sidewinder 302 is connected to a Visibility Data Server 304 by a VPN link 303 and preserves a Virtual Tag Database (VTDB) 305.

The VTDB 305 is shared by many Sidewinders 302 within a Visibility Network 100 but effectively produces a PostgresSQL database that represents the tag, its data and reads over last human legible, comma separated, date time-stamped record of every tag transaction. It provides a total RuBee network history of critical evens including signal, errors, rereads, CRC checks and can be used for audits or for network statistics. Sidewinders 302 spool approximately 24 hours of tag data in a local database, providing protection and backup if any Network outages occur over the VPN 303.

Figure 4:
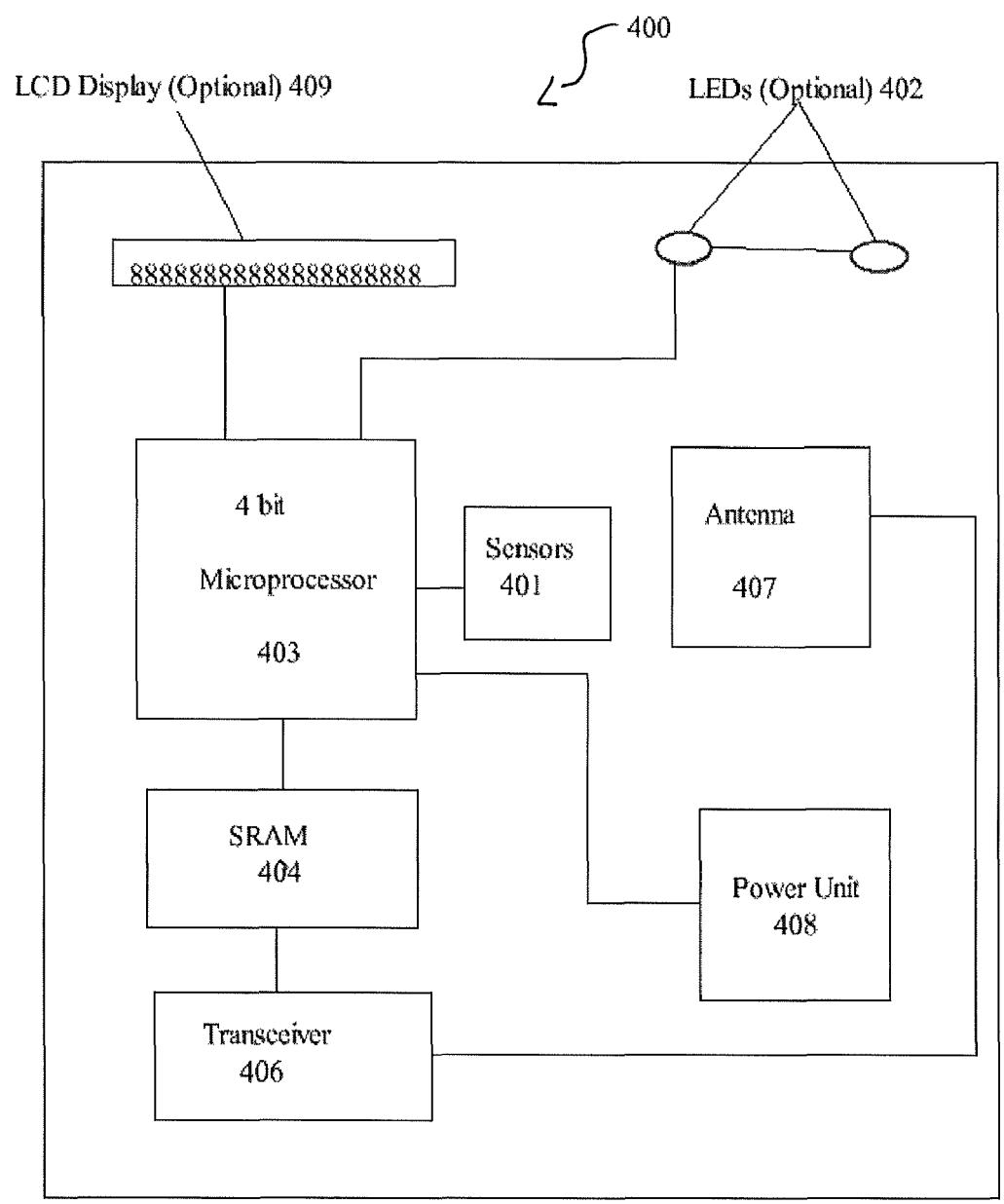
FIG. 4 shows a block diagram of a Long Wavelength Tag.

FIG. 4 illustrates a block diagram 400 of the RuBee tag 301a. The RuBee tag 301a includes a transceiver 406. New long-wavelength (LW under 450 Khz) power efficient designs have made it possible to create active transceivers with IP addresses and peer-to-peer, on-demand, communications, with an acceptable range to work as a local network. The RuBee tag 301a also includes a power unit 408. The power unit 408 could be a quarter-sized CR2525 Li battery with a 10-year or longer battery life. The communication is taken place through an antenna 408.

Current RuBee Networks 301 use a protocol known as RuBee IV, and consume only a few microamps in standby and less than 1 milliamp in active mode. RuBee tag 301a may be fully programmable using low cost 4-bit processors 403 capable of encryption and decryption and complex functions associated with managing IP addresses (DCHP, ARP). RuBee tag 301a is remotely driven form the standby mode to active mode the sidewinder 302.

RuBee Networks 301, offer the advantage of low cost tags and low cost base stations (<$100). Moreover, because RuBee tag 301a have the power source 408, they may optionally be equipped with sensors 401, sRAM 404, displays 409, LEDs 402 and may also be low in cost (<$2 per tag). Some Rubee protocol designs also eliminate the battery and cost about 15 cents with a reduced range. Networks of thousands of peer-to-peer RuBee tags work reliably as a visibility network. RuBee tags are not affected by liquids, can be used underwater or as an implantable device, and are minimally affected by steel.

The base station apparatus employed may be that disclosed in U.S. application Ser. No. 11/462,981 filed Aug. 7, 2006, incorporated herein by reference. The tags employed can be those described in US 2007/0115132, published May 24, 2007, incorporated herein by reference for all purposes. The RF technology can be that described in US 2007/0063895, published Mar. 22, 2007, incorporated herein by reference for all purposes. The tag technology can be that described in U.S. Pat. No. 7,049,963, issued May 23, 2006, incorporated herein by reference for all purposes. The transceiver communicating with the tags can be that described in US 2007/0120649, published May 31, 2007, incorporated herein by reference for all purposes.

RuBee industrial visibility networks may be used to provide visibility on or near steel shelves and in harsh environments such as operating theaters (rooms), oil and chemical plants, warehouses and retail stores. Long wavelength, low bandwidth visibility systems and sensor networks are currently in use at industrial installations.

Figure 5:
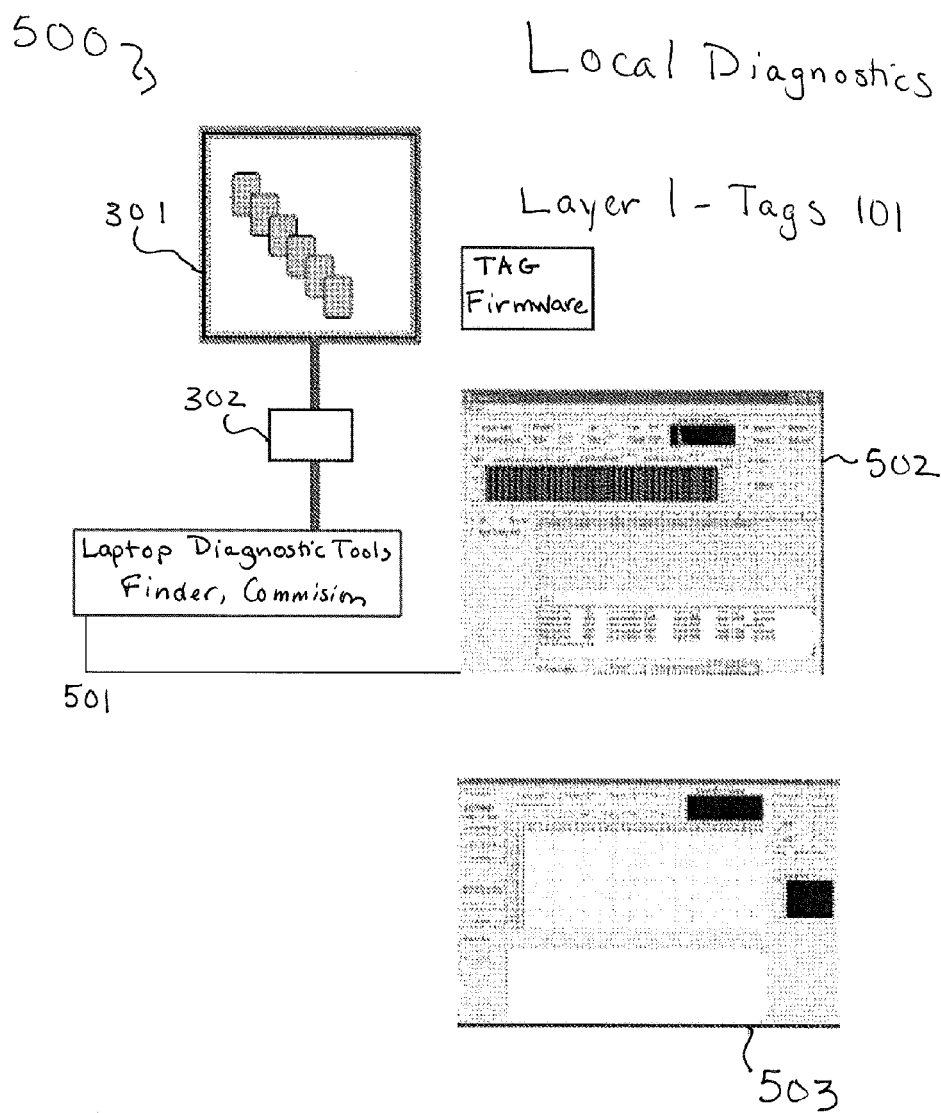
FIG. 5 shows a block diagram of a diagnostic tools used in the Dot-Tag Visibility Network.

FIG. 5 shows a block diagram 500 of a diagnostic tools used in the Dot-Tag Visibility Network 201. The Dot-Tag Visibility Network 201 includes a suite of diagnostic tools 501 that run on a laptop. The diagnostic tools talk direct to the Sidewinder 302 and bypass the Linux kernel. The tools 501 drive the RuBee base station direct and make it possible to read and program an individual tag through the RuBee network 301. These tools 501 will work from anywhere in the world providing you have the correct IP address, passwords and VPN authority. They can collect tag statistics, read memory, change addresses, or almost any other maintenance diagnostic function as shown in Tables 502 and 503.

The tools 501 produce a data log consistent with Part11 logs and represent the supreme check on network and tag integrity.

Figure 6:
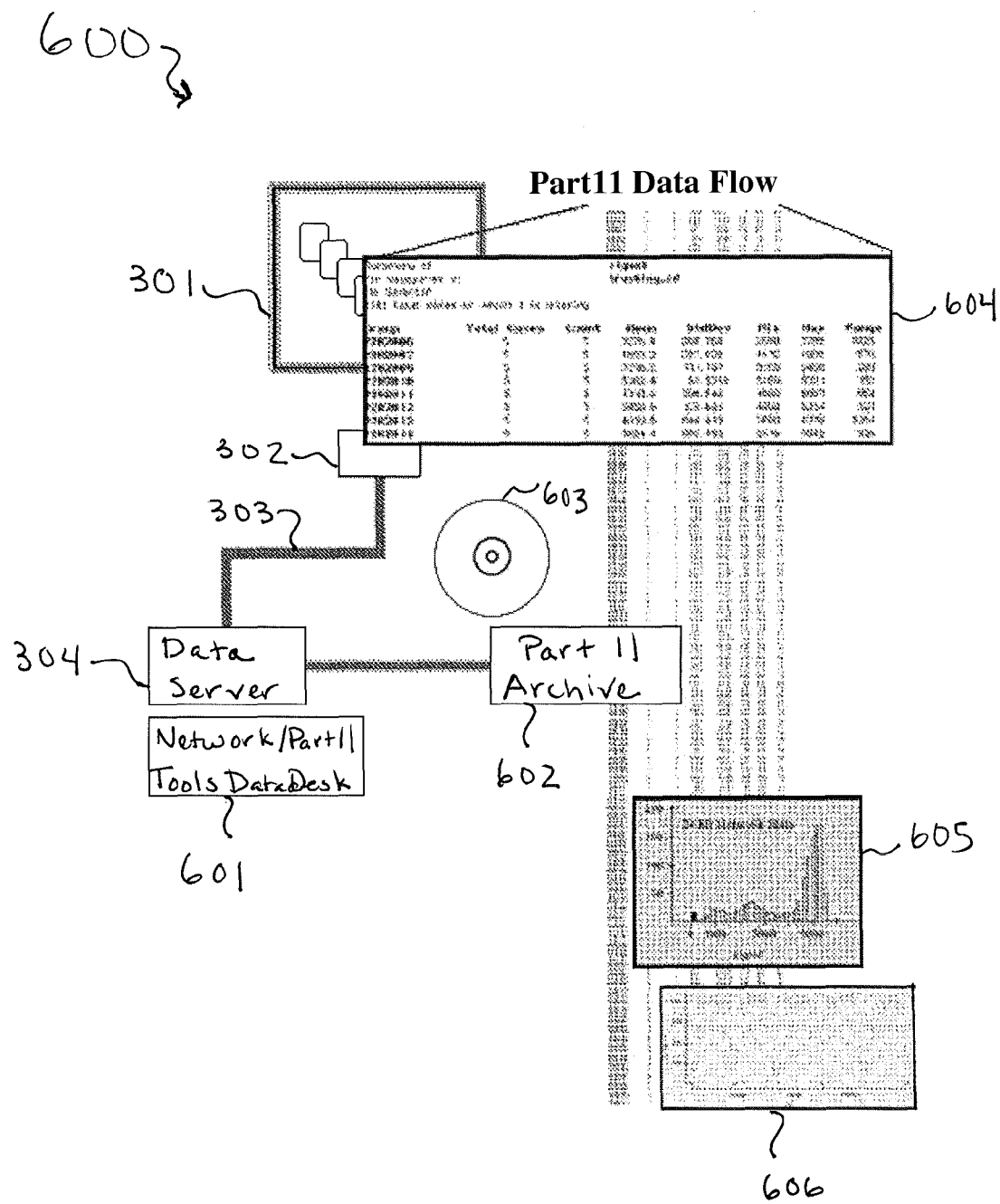
FIG. 6 shows a block diagram of a Part11 Data Flow.

FIG. 6 shows a block diagram 600 of a Part11 Data Flow. The Sidewinder 302 communicates by a VPN 303 to a data server 304 which manages a PostgresSQL database of virtual tags 305. These data links all Linux-Linux and use standard SQL protocols. The Visibility Data Server 304 creates and preserves off-site physical backups, as well as Part11 human legible records (Archive) 602 of every tag transaction. The Part11 records (Archive) 602 include tag signal strength, tag field boundaries, CRC confidence checks, statistics on each tag read, failed reads, packet relays, noise levels, and tag data.

Part11 data 602 may be encrypted using Tools Data Desk 601 and emailed to a subscriber every hour day or week, and will identify and diagnose tag, antenna or network problems before they happen. Statistics of reads and read errors for individual tags or millions of tags may be routinely viewed in a few seconds shown in Tables 604, 605 and 606. This data is written with an independently verified date time stamp to a WORM optical disk drive 603 to create an audit trail that meets 21CFRPart11 for all tag transactions. The Part11 audit trails also meet SEC Rule 17a-4, HIPAA, Sarbanes-Oxley (SOX), and DoD 5015.2 standards.

Figure 7:
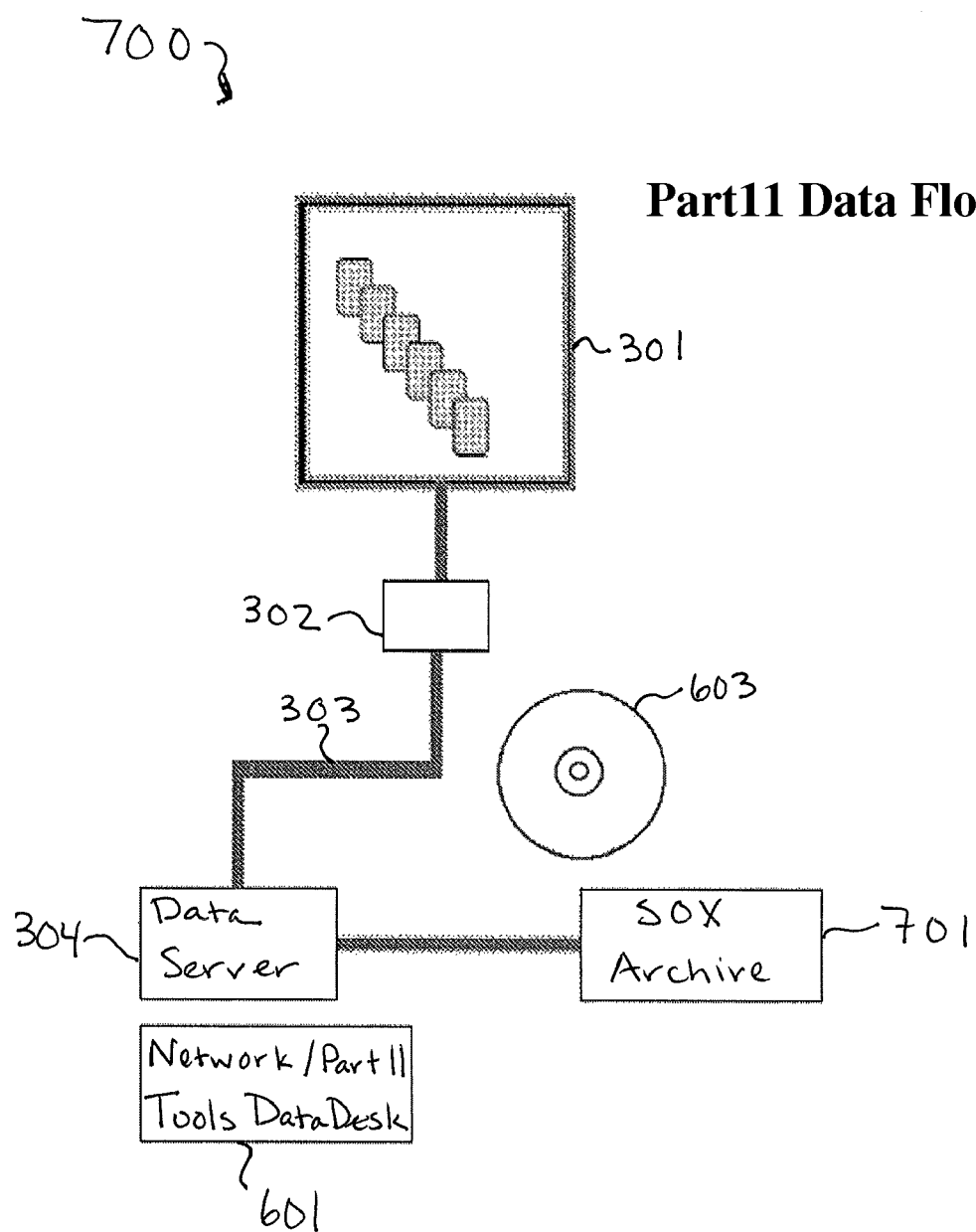
FIG. 7 shows another block diagram of the Part11 Data Flow.

FIG. 7 shows another block diagram 700 of the Part11 Data Flow. The Sidewinder 302 communicates by a VPN 303 to a data server 304 which manages a PostgresSQL database of virtual tags 305. These data links all Linux-Linux and use standard SQL protocols. The Visibility Data Server 304 creates and preserves the SOX Archive 701. The SOX Archive 701 is a human readable comma separated, date time stamped certified record of every box or item transaction. It provides a human legible total product network history of critical events including time on shelf, when removed, physical inventory, date sold, reorder points, and billing information.

SOX data 701 may be encrypted using Tools Data Desk 601 and emailed to a subscriber day, week, or month and will identify and diagnose product inventory delivery problems before they happen. Statistics of product movement for individual items or millions of items may be routinely viewed in a few seconds. This data is written with an independently verified date time stamp to a WORM optical disk drive 603 to create an audit trail that meets SEC rules for all product transactions.

Figure 8:
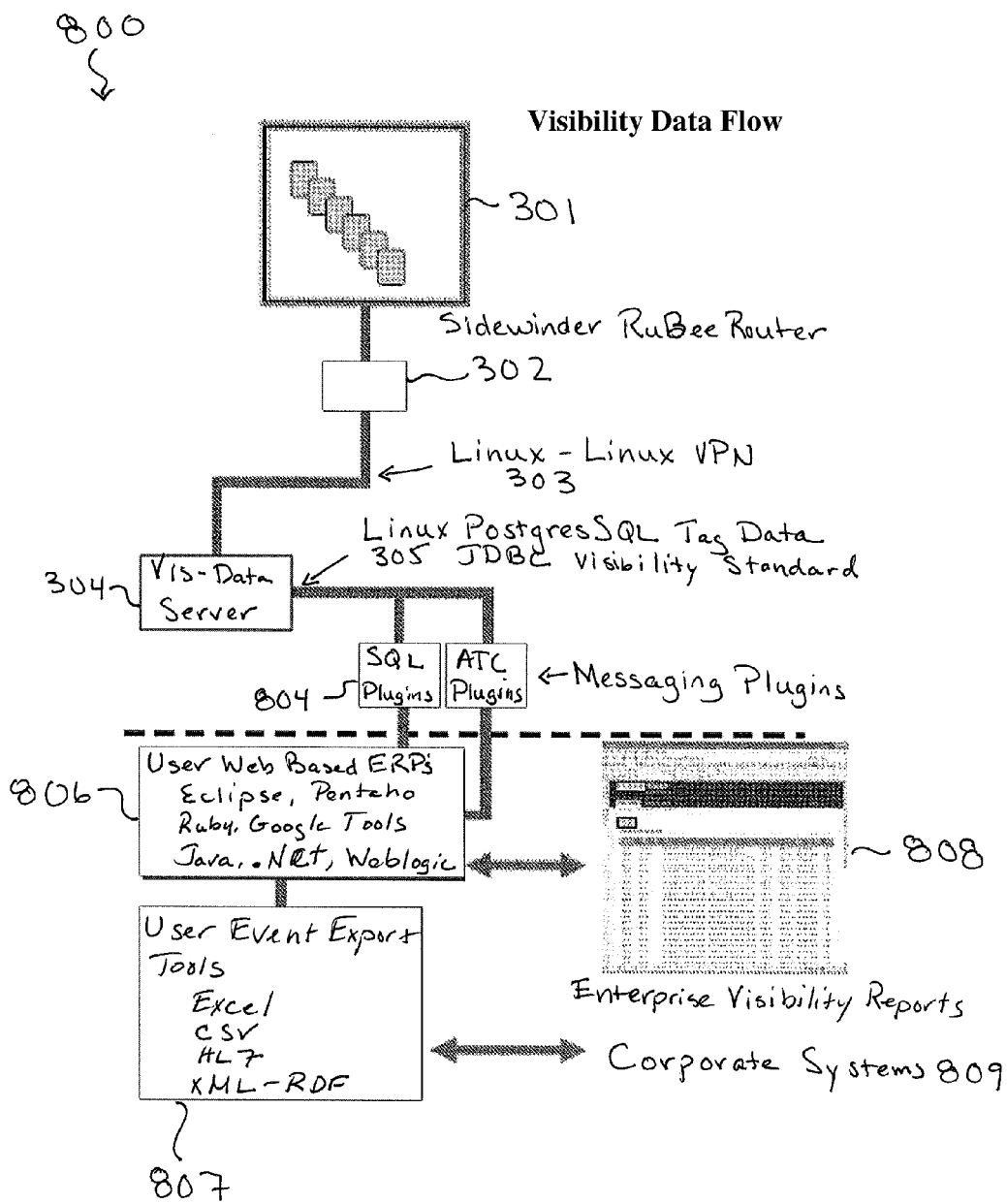
FIG. 8 shows a block diagram of a Visibility Data Flow.
Figure 9:
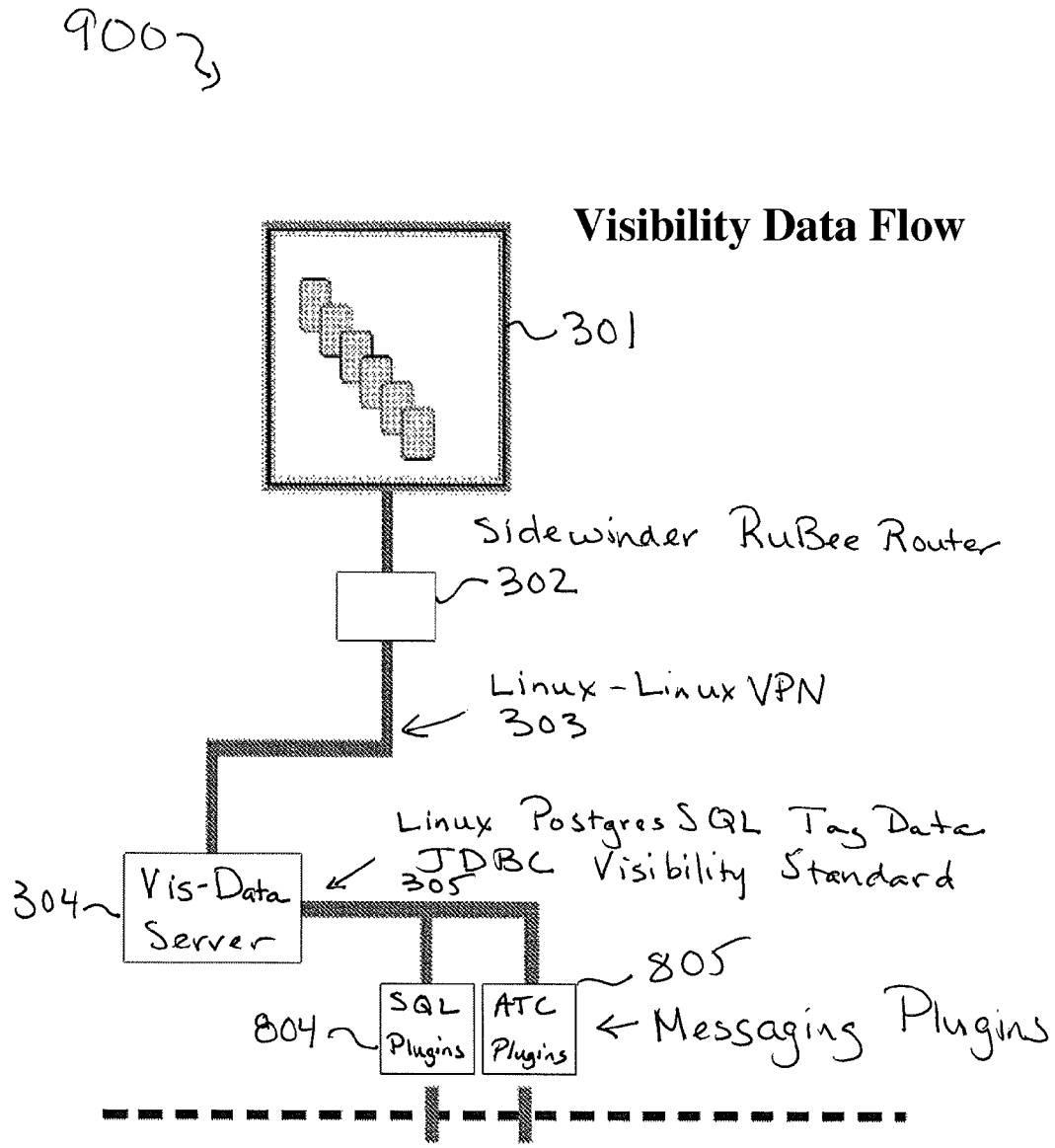
FIG. 9 shows another block diagram of the Visibility Data Flow.

FIG. 8 and FIG. 9 shows a block diagram 800 and 900 of a Visibility Data Flow. User Web enabled Visibility Systems/reports and ERP's 806 are created by simple plugs to the Visibility Data server 304. The Vis-Data Server 304 contains the full Virtual Tag Database 305 updated by all Sidewinders 302. The Tag Database 304 is actively maintained but the sidewinders 302. Standard interfaces are available for PostgresSQL to JAVA, Ruby on Rails, Pentahoe and many other enterprise driven ERP systems 806. It is possible to create sophisticated and interactive systems, real-time visibility reports and systems using the Vis-Data Server and plug in a matter of days.

The Air Traffic Control (ATC) ATC plug 805 is used to control functions within a RuBee network 301. For example to turn on a LED 402 on a tag the tag is accessed using a simple instruction with flash time etc through the ATC plug 805. The read times for tags, router start stop times, and antenna tune checks etc. are all controlled through the ATC plug 805. The SQL plug 804 is used to support a data requests. Real-time visibility reports are shown in Table 808.

The user ERP's 806 are also responsible for exports to a customer system 809. For example business rules linked to a billing event and all information tied to that are exported in Layer 6. The layer 6 includes a User Event Export Tools 807 that covert a real-time visibility reports into report that fits a specific event like billing. Examples of User Event Export Tools 807 are Excel, CSV, HL7 and XML-RDF.

Figure 10:
FIGS. 10-13 show example of a real life application of the Visibility Network.
Figure 10:
Figure 10:
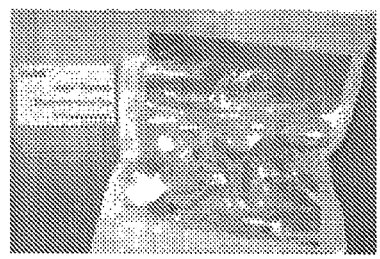

FIGS. 10-13 show example of a real life application of the Visibility Network 100. FIG. 10 is a Smart Shelf RuBee Local Net 1000. Typical smart shelf application for medical devices. The devices are steel and are packaged in conductive Aluminum as shown in Pictures 1001-1003. Box's are stacked 6-8 high and two to three rows deep.

Figure 11:
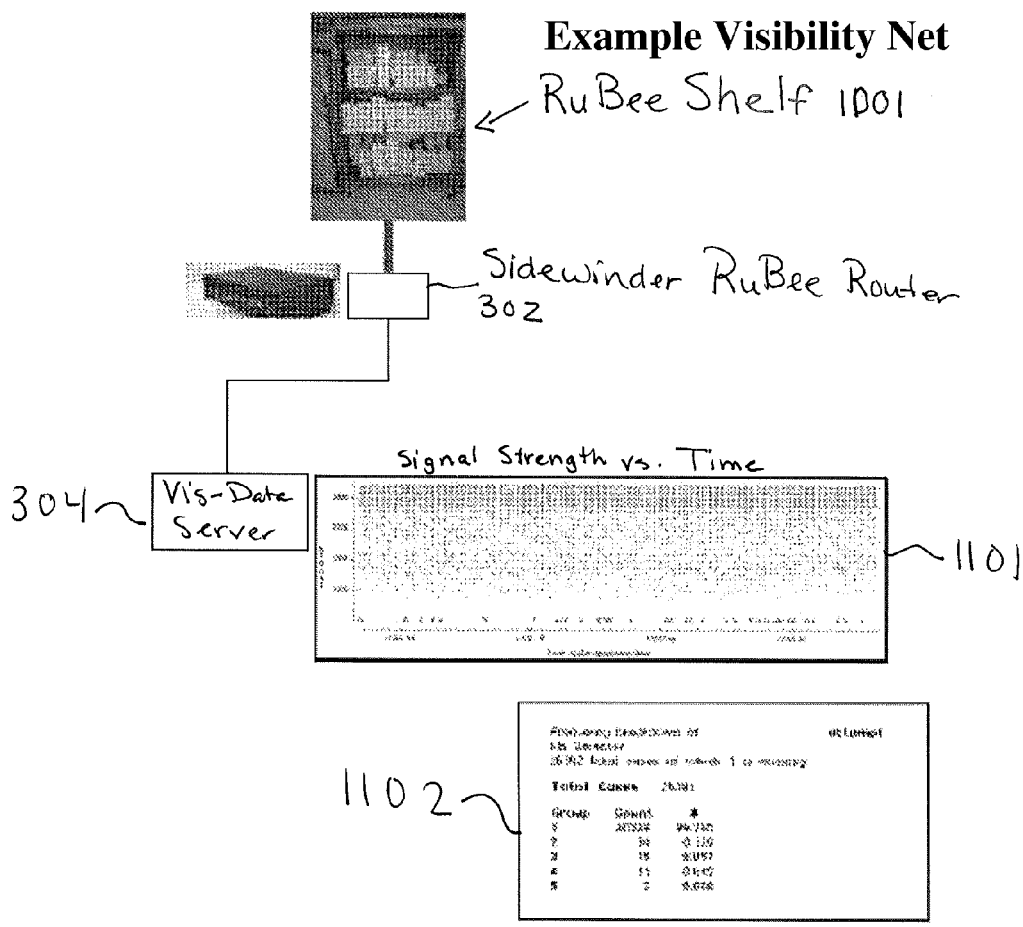

FIG. 11 is an example 1100 how the Dot-Tag Network 201 works in real life. The graph 1100 shows signal strength vs time for 24 hours. A full inventory is carried out each ten minutes for 203 Box's on the shelf That means each box is checked about 130 times each day. The green dots represent reads, the red represent no-reads on an attempt. Important to not no miss-reads occur at a high signal. This usually means small burst of noise or that box has been removed.

RuBee Network 301 activated smart shelves 1001 has been placed as a network in Hospitals. Orthopedic implants have tags placed on outside of box. Note these devices are steel and are packaged with heavy aluminum sealed packages and stacked on steel shelves. The Part11 data 602 and tools shows 24 hours of reads (26,391 per day) and shows that 99.765% or 26,329 reads are 100% on first attempt. 0.129 were successful on second attempt and so on for 100% reads up to five attempts. Local noise, and individual moving or searching for a box etc. May lead to re-reads as shown in the Table 1102.

Figure 12:
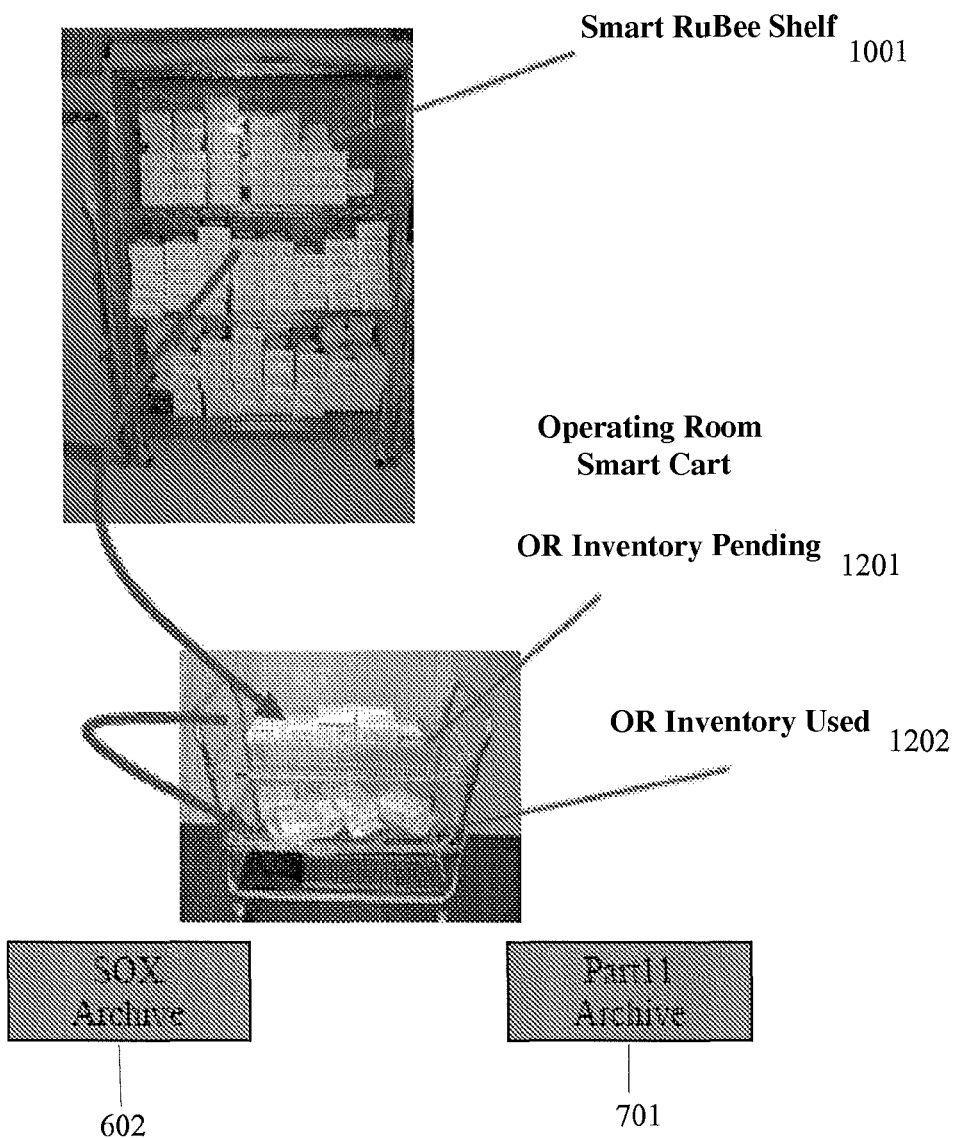
Figure 13:
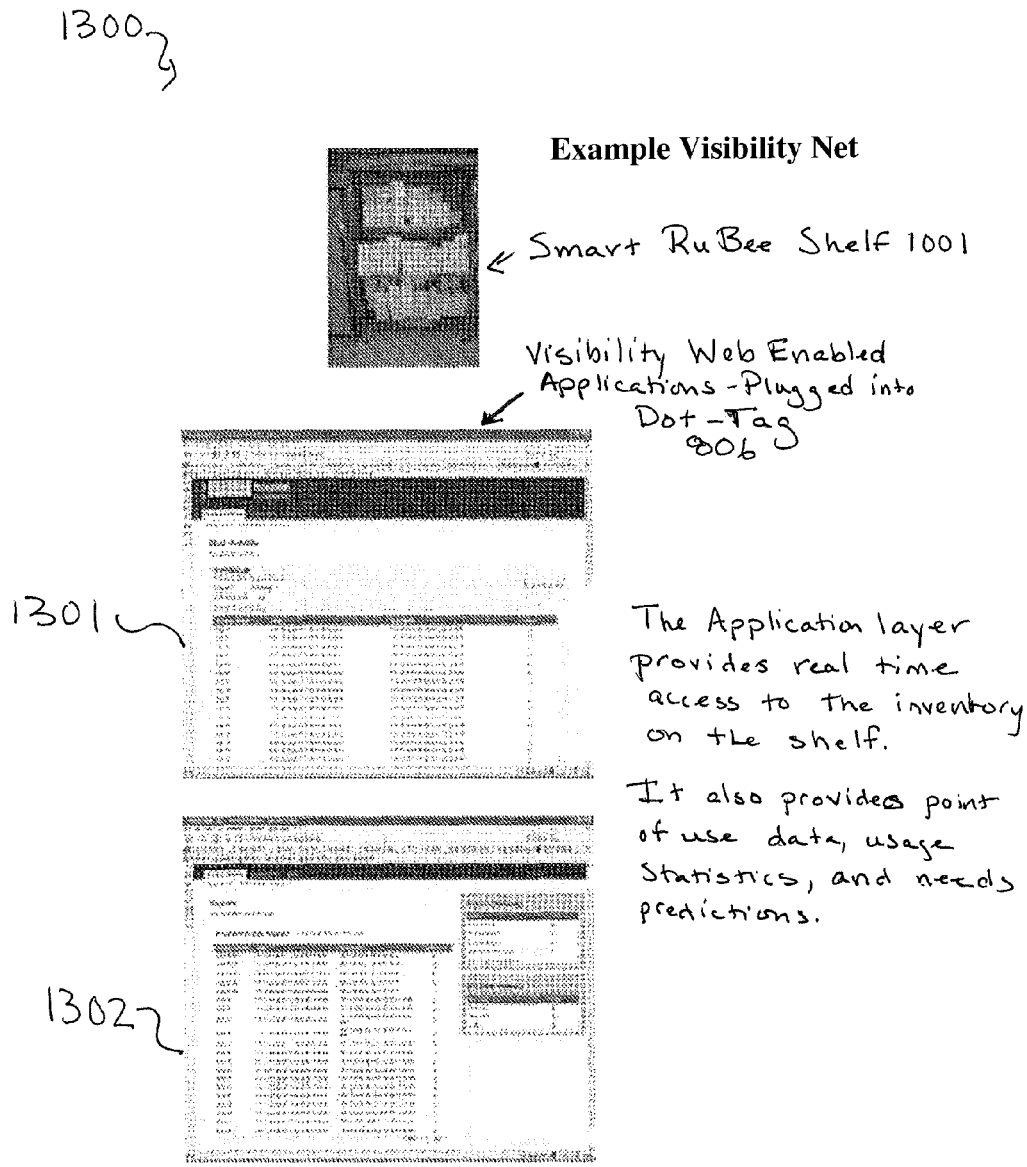

FIG. 12 and FIG. 13 how the Dot-Tag Network 201 works when an Orthopedic implants are removed from the smart shelves 1001 and placed in the cart that has two levels. Level one 1201 is the inventory pending and level two 1202 inventory used. The Part11 Log 602 provides an archive for all tag and network based transactions. The Sox Log 701 provides an archive for all product based transactions.

Tables 1301 and 1302 are examples of a real time access to the inventory of the shelf 1001. It also provided point of use data, usage statistics, and needs predictions.

It will thus be appreciated that the above discussion enables one to provide a system comprising:
 a plurality of routers, each communicating via an internet with a server;
 for each said router, a multiplicity of respective long-wavelength ID tags each disposed for attachment to an asset, each said tag comprising a tag antenna operable at a low radio frequency not exceeding 1 megahertz, a transceiver operatively connected to said antenna, said transceiver being operable to transmit and receive data at said low radio frequency, a programmed data processor to process data received from the transceiver, said tag having a unique hardware address, said transceiver emitting an identification signal upon interrogation by said router;
 each said router communicating with its respective tags from time to time via said low radio frequency, said router maintaining an association between each said tag and a corresponding IP address;
 each said router responsive to queries from the server with information from one or more of its respective tags.

The server can be a user web-based ERP, the server providing real-time visibility reports. 8. The user web-based ERP may be selected from the set consisting of Eclipse, Pentaho, Ruby on Rails, Google tools, Java, .Net and Weblogic.

At least one of the long-wavelength tags can include a sensor or a Light Emitting Diode (LED).

The server can create and preserve a Part11 human-legible record of tag transactions. The Part11 human legible records can include tag signal strength, tag field boundaries, CRC confidence checks, statistics on said tag, failed reads, packet relays, noise levels, and the tag data.

The server can create and preserve a Sarbanes-Oxley (SOX) archive, said SOX archive providing a human-legible total asset network history of critical events including time off shelf, when removed, physical inventory, date sold, reorder thresholds, and billing information.

The system can further comprise a tool for data export from the server, said tool selected from the set consisting of Excel, CSV, HL7 and XML-RDF.

The IP address of a tag may be stored within the tag, for example in a nonvolatile memory. In such a case, the router learns the IP address by interrogating the tag.

On the other hand, the tag may simply have a unique hardware address, and the assignment of an IP address to the tag can take place in the router (the sidewinder). In such a case, router maintains within the router a correspondence between the assigned IP address and the hardware address of the tag.

The router may power the tag by bathing the tag in an RF energy field.

It should be noted that the matter contained in the above description or shown in the accompanying drawings should be interpreted as illustrative and not in a limited sense. The following claims are intended to cover all generic and specific features described herein, as well as all statements of the scope of the present method and system, which, as a matter of language, might be said to fall there between.

What is claimed is:

1. A system comprising:
 a plurality of routers, each communicating via an internet with a server;
 for each said router, a multiplicity of respective long-wavelength ID tags each disposed for attachment to an asset, each said tag comprising a tag antenna operable at a low radio frequency not exceeding 1 megahertz, a transceiver operatively connected to said antenna; said transceiver being operable to transmit and receive data at said low radio frequency, a programmed data processor to process data received from the transceiver, said tag having a unique hardware address, said transceiver emitting an identification signal upon interrogation by said router;
 each said router communicating with its respective tags from time to time via said low radio frequency, said router maintaining an association between each said tag and a corresponding IP address;
 each said router responsive to queries from the server with information from one or more of its respective tags; wherein the server is a user web based ERP, and wherein the server provides real-time visibility reports.

2. The system of claim 1, wherein at least one of said long-wavelength tags includes a sensor.

3. The system of claim 1, wherein at least one of said long-wavelength tags includes a Light Emitting Diode (LED).

4. The system of claim 1, wherein said server creates and preserves a Part11 human-legible record of tag transactions.

5. The system of claim 4, wherein the Part11 human legible records include tag signal strength, tag field boundaries, CRC confidence checks, statistics on said tag, failed reads, packet relays, noise levels, and the tag data.

6. The system of claim 1, wherein said server creates and preserves a Sarbanes-Oxley (SOX) archive, said SOX archive provides a human legible total asset network history of critical events including time off shelf, when removed, physical inventory, date sold, reorder thresholds, and billing information.

7. The system of claim 1, wherein the user web based ERP is selected from the set consisting of Eclipse, Pentaho, Ruby on Rails, Google tools, Java, .Net and Weblogic.

8. The system of claim 1, further comprising a tool for data export from the server, said tool is selected from the set consisting of Excel, CSV, HL7 and XML-RDF.

9. The system of claim 1 wherein for at least one router and for at least one tag, the tag has its respective IP address stored therewithin, and wherein the router learns the IP address of the at least one tag by interrogating said tag.

10. The system of claim 1 wherein for at least one router and for at least one tag, the router assigns the IP address to the at least one tag, and the router maintains within the router a correspondence between the assigned IP address and the hardware address of the tag.

11. The system of claim 1 wherein for at least one router and for at least one tag, the at least one router powers the at least one tag by bathing the tag in an RF energy field.

12. A method for use with a system comprising a plurality of routers, each communicating via an Internet with a server; for each said router, a multiplicity of respective long-wavelength ID tags each disposed for attachment to an asset, each said tag comprising a tag antenna operable at a low radio frequency not exceeding 1 megahertz, a transceiver operatively connected to said antenna, said transceiver being operable to transmit and receive data at said low radio frequency, a programmed data processor to process data received from the transceiver, said tag having a unique hardware address, said transceiver emitting an identification signal upon interrogation by said router, the method comprising the steps of: for each router, communicating with its respective tags from time to time via said low radio frequency, said router maintaining an association between each said tag and a corresponding IP address; for each router, responding to queries from the server with information from one or more of its respective tags; wherein the server is a user web based ERP, and wherein the server provides real-time visibility reports.

13. The method of claim 12 wherein for at least one router and for at least one tag, the tag has its respective IP address stored therewithin, the method further comprising the step of: at the at least one router, interrogating the at least one tag, thereby learning the IP address of the at least one tag.

14. The method of claim 12 wherein for at least one router and for at least one tag, the at least one tag does not have an IP address stored therewithin, the method further comprising the step of at the at least one router, assigning the IP address to the at least one tag, and at the at least one router, maintaining within the router a correspondence between the assigned IP address and the hardware address of the tag.

15. The method of claim 12 wherein for at least one router and for at least one tag, the method further comprises the step of at the at least one router, powering the at least one tag by bathing the tag in an RF energy field.

16. A router, the router disposed for communication via an internet with a server; the router comprising means for communication with a multiplicity of respective long-wavelength ID tags each disposed for attachment to an asset, each said tag comprising a tag antenna operable at a low radio frequency not exceeding 1 megahertz, a transceiver operatively connected to said antenna, said transceiver being operable to transmit and receive data at said low radio frequency, a programmed data processor to process data received from the transceiver, said tag having a unique hardware address, said transceiver emitting an identification signal upon interrogation by said router; the router disposed to communicate with its respective tags from time to time via said low radio frequency, said router maintaining an association between each said tag and a corresponding IP address; each said router responsive to queries from the server with information from one or more of its respective tags; wherein the server is a user web based ERP, and wherein the server provides real-time visibility reports.

17. The system of claim 16 wherein for at least one tag, the tag has its respective IP address stored therewithin, and wherein the router learns the IP address of the at least one tag by interrogating said tag.

18. The system of claim 16 wherein for at least one tag, the router assigns the IP address to the at least one tag, and the router maintains within the router a correspondence between the assigned IP address and the hardware address of the tag.

19. The system of claim 16 wherein for at least one tag, the router powers the at least one tag by bathing the tag in an RF energy field.

* * * * *